United States Patent
Fried

[15] 3,698,386
[45] Oct. 17, 1972

[54] CARDIAC RHYTHM COMPUTER DEVICE

[72] Inventor: Robert Fried, 52 Herbert Drive, East Brunswick, N.J. 08816

[22] Filed: July 16, 1971

[21] Appl. No.: 163,507

Related U.S. Application Data

[63] Continuation of Ser. No. 822,548, May 7, 1969, abandoned.

[52] U.S. Cl. ............................................128/2.06 A
[51] Int. Cl. ..................................................A61b 5/04
[58] Field of Search.......................................128/2.05, 128/2.06 A, 2.06 B, 2.05 F, 2.05 R, 2.1 R

[56] References Cited

UNITED STATES PATENTS

| | | | |
|---|---|---|---|
| 3,744,019 | 8/1964 | Haber | 128/2.06 A |
| 3,518,983 | 7/1970 | Jorgensen | 128/2.06 A |
| 3,606,882 | 9/1971 | Abe et al. | 128/2.06 A |

*Primary Examiner*—William E. Kamm
*Attorney*—Ostrolenk, Faber, Gerb & Soffen

[57] ABSTRACT

A device which monitors electrocardiac activity for providing direct and discrete output readings which simply and positively identify specific cardiac activity patterns. Samples are taken over predetermined time intervals during which the total number of cycles of the entire electrocardiac signal occurring during the time interval undergoes slope analysis for the purpose of providing in-line indices of the various cardiac arrhythmias. Mathematical manipulation of the electrocardiac signals (also referred to as EKG signals) are performed by analog circuit means to yield a direct output reading which, by providing an appropriate scale or by providing a chart usable in conjunction with the output meter, positively and directly provides an indication of the various cardiac arrhythmias.

7 Claims, 4 Drawing Figures

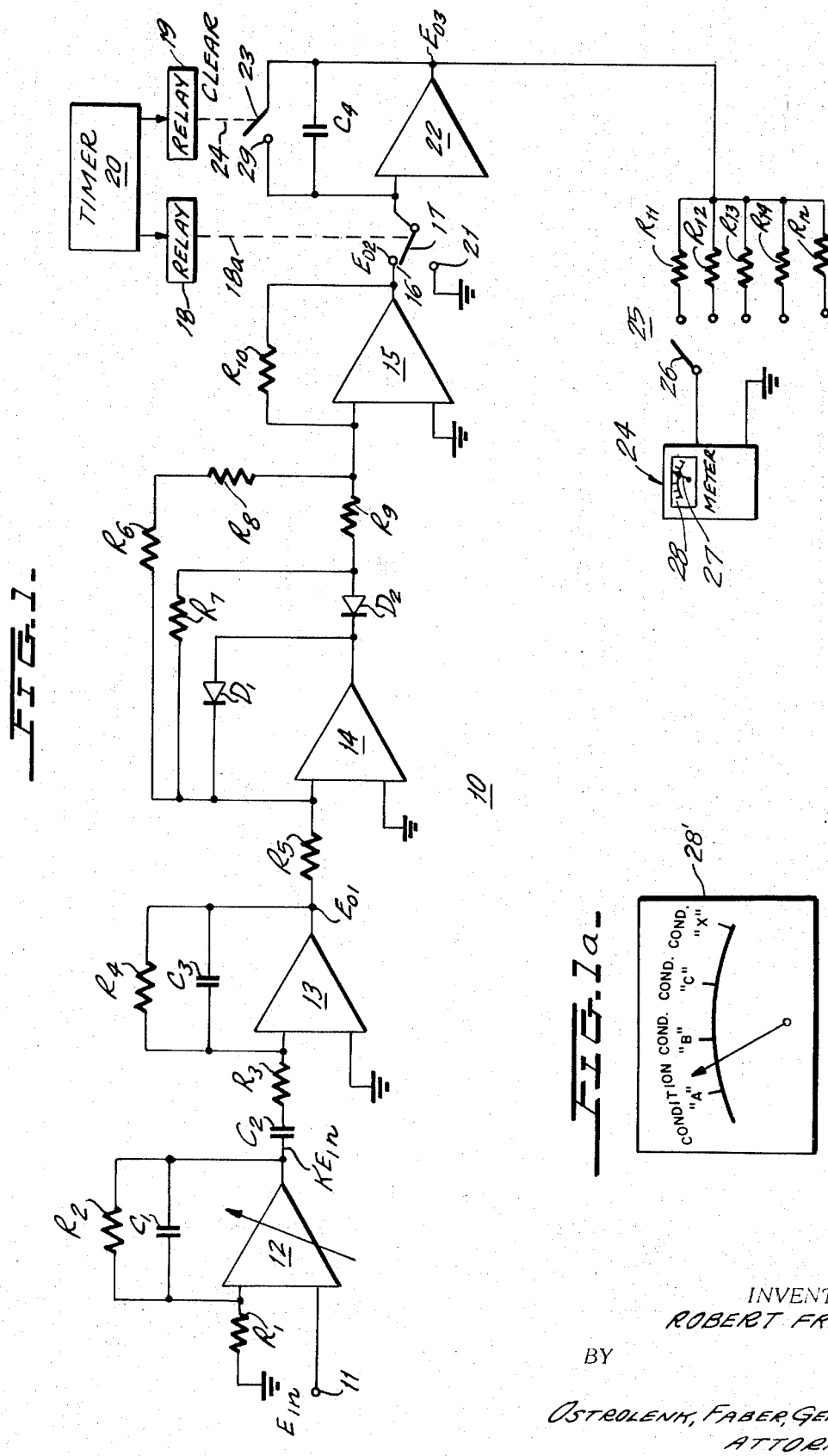

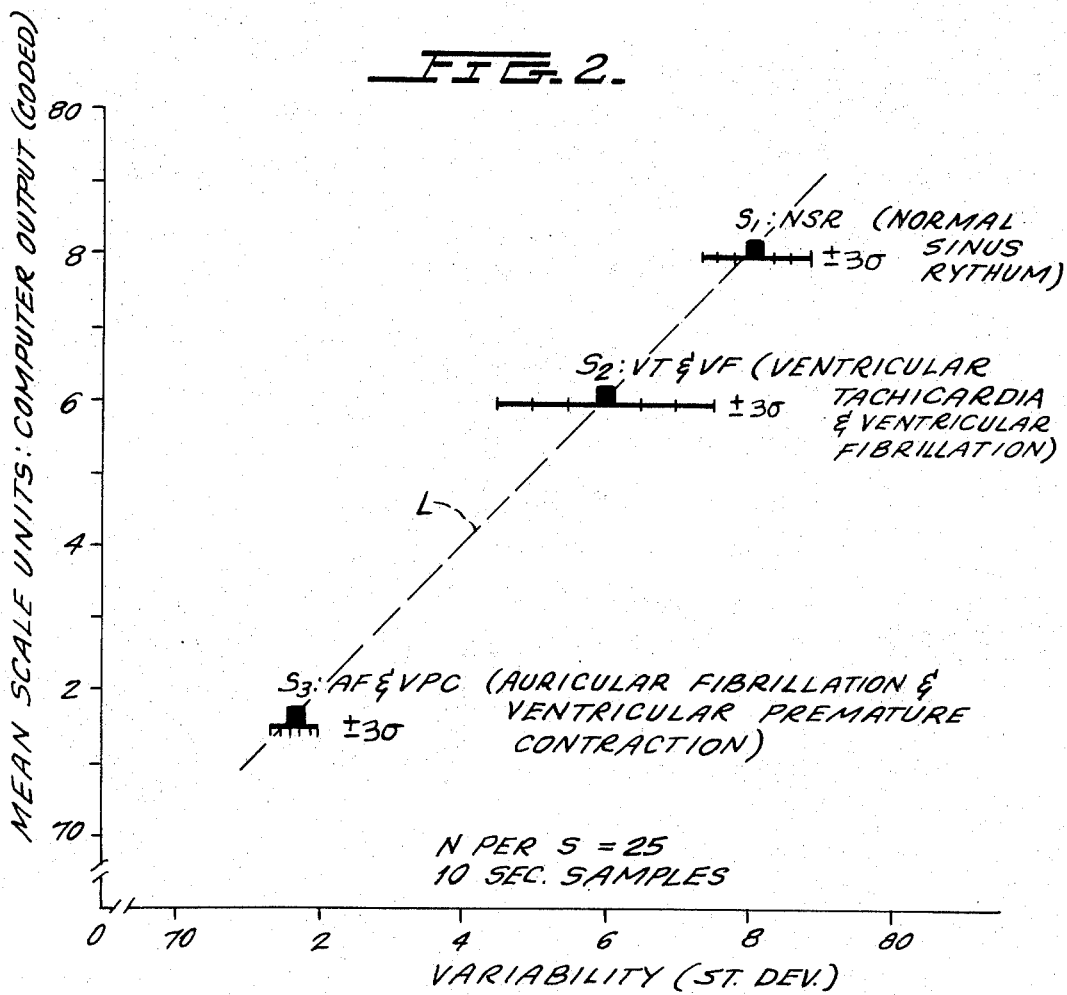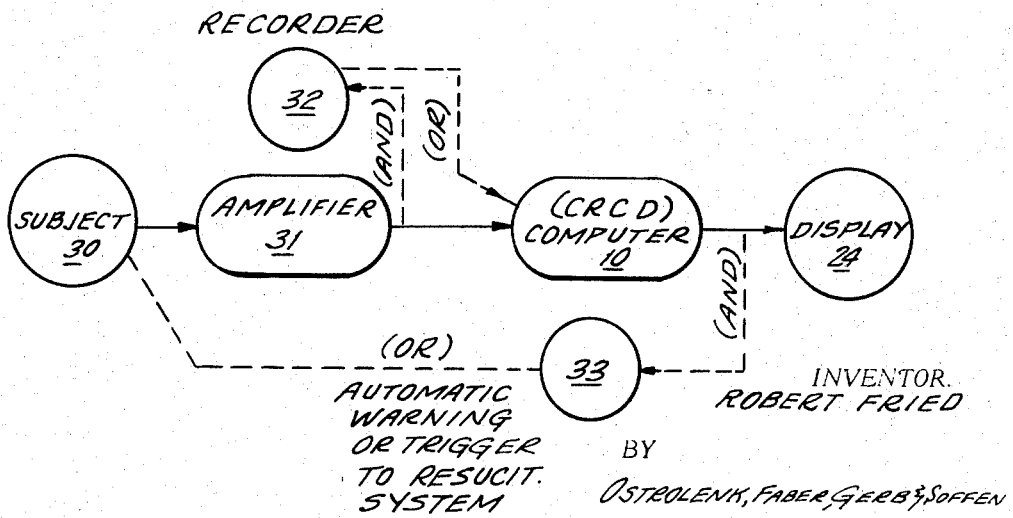

CARDIAC RHYTHM COMPUTER DEVICE

This application is a continuation of Ser. No. 822,548, filed May 7, 1969, now abandoned.

The present invention relates to means for monitoring EKG signals, and more particularly to the use of a novel analog system for cardiac analysis which is capable of developing a discrete output reading for providing in-line analysis of cardiac arrhythmias.

Abnormalities in the functioning of the human (or animal) heart are typically monitored by means of electrocardiograms wherein electrocardiac signals taken from the body of the subject are coupled to a suitable recorder which forms a graph upon a paper tape for the purpose of subsequent study and analysis. Such electrocardiograms permit visual observation of the EKG signal for a determination of its characteristics.

The EKG signal typically is comprised of a group of pulses which include a P-wave followed by a QRS complex which, in turn, is followed by one additional pulse commonly referred to as the T-wave.

In a normal heart, these pulses or waves have certain predetermined characteristics and normally fall within prescribed limits. However, in the presence of abnormal conditions, the EKG signal, as manifested by its individual pulses, will deviate from the normal ranges. In order to detect such abnormalities, the services of a highly skilled electrocardiologist are normally required. Such an individual normally devotes a considerable amount of time and energy toward the study of an electrocardiogram which is a very time-consuming process. Due to the tedious and inprecise nature of the evaluation, such evaluations have at times proved unreliable. Also due to the necessity for making recordings of EKG signals over long periods of time, this requires the accumulation of large amounts of data, which still further complicate the evaluation by the highly skilled individual. Present techniques are normally available only in the professional offices of the individual trained to evaluate such data or alternatively is available in hospitals. The present invention permits the device to be put to "field" use.

The present invention provides application of a computational device capable of providing a direct and discrete output reading for in-line analysis of cardiac arrhythmias. Due to the very specific nature of the indices generated by the device, the need for a trained observer to interpret the results may be eliminated.

The computational device of the present invention is comprised of means for amplifying EKG signals which may be taken directly from typical electrodes employed in deriving EKG signals or from the output of the amplifier of an electrocardiograph. The appropriately amplified signals are then differentiated to ascertain the rate of change of slope of the pulses or waves of each EKG signal. The differentiated waveform is then applied to a circuit which determines the absolute value of differentiated waveform at any given instant of time relative to a predetermined signal level. The resulting output signal is then integrated with respect to time over a predetermined time interval, during which interval the output is observed through the use of a suitable meter which may directly be calibrated to indicate each one of the various cardiac arrhythmias on its scale or which may be used in conjunction with a chart in which the reading may be compared against the figures of the chart to determine the particular cardiac arrhythmia which may be present. The circuit is reset at the termination of each time interval and cleared to allow a new reading during which each reading may be observed in a substantially continuous on-line fashion.

As an additional application, the output of the device may serve as the input for warning devices indicating a change in trend with reference to pathological trend categories such as, for example, ventricular fibrillation, or may serve as the control means for automatically triggering a defibrillator or rhythm controlling device in conjunction with the monitoring of cardiac arrhythmias requiring such immediate or on-line attention.

It is, therefore, one object of the present invention to provide for the application of a novel on-line computational device for providing direct output readings indicative of various cardiac arrhythmias.

Another object of the present invention is to provide a novel on-line computational device for use in contemporaneously and continuously monitoring EKG signals during predetermined repetitive time intervals to obtain a direct output reading indicative of various cardiac arrhythmias.

Still another object of the present invention is to provide a novel on-line computational device for use in contemporaneously and continuously monitoring EKG signals during predetermined repetitive time intervals to obtain a direct output reading indicative of various cardiac arrhythmias, and which may further be provided with warning devices for indicating a change in trend with reference to predetermined pathological trend categories, or may serve as control means for automatically triggering defibrillation or rhythm controlling device means to provide for immediate correction of a condition detected by the computational device.

These as well as other objects of the present invention will become apparent when reading the accompanying description and drawings in which:

FIG. 1 is a schematic diagram showing a computational device designed in accordance with the principles of the present invention.

FIG. 1a is a view showing a modified arrangement for the meter face of FIG. 1.

FIG. 3 is a block diagram showing the manner in which the device of FIG. 1 may be incorporated into a system for providing warning indications or corrective action.

FIG. 2 is a chart showing the types of readings which may be obtained with the computational device of the present invention.

FIG. 1 shows an analog computational device 10 for analyzing EKG signals and which is comprised of an input terminal 11 for receiving EKG signals, which signals may be taken from the electrical output terminal of an electrocardiograph device or directly from the electrodes normally employed with electrocardiograph devices which are applied to the body of the subject to derive the EKG signals. These signals are applied to terminal 11 for application to an adjustable gain operational amplifier 12 coupled in such a manner as to amplify the input signals $E_{in}$ to a value $E_0$ wherein $E_0 = KE_{in}$ where K is a constant. The output of operational amplifier 12 is applied through series connected capacitor $C_2$ and resistor $R_3$ to the input of a second operational amplifier 13 which is coupled in such a manner as to differentiate the signals applied to its input, yielding an output signal $E_{01}$ wherein $$E_{01} = \frac{d(KE_{in})}{dt},$$

where $K$ is a constant. The differentiated signals are then applied to the input of a third operational amplifier 14 whose output is coupled through series connected diode $D_2$ and resistor $R_9$ to the input of an operational amplifier 15 which, together with operational amplifier 14, forms a circuit which develops an output signal $E_{02}$ at terminal 16 wherein $$E_{02} = \left| \frac{d(KE_{in})}{dt} \right|,$$

where $K$ is a constant.

Output terminal 16 is selectively connectable with movable contact 17 under control of a relay 18 which is under control of a timer 20 for the purpose of operating relay 18 to move contact 17 (through the mechanical connection shown by dotted line 18a) between contact 16 and grounded contact 21.

The contact 17 is capable of selectively connecting either contact 16 or grounded contact 21 to the input of an operational amplifier 22 connected in such a manner as to integrate the signals applied to its input terminal to develop an output signal $$E_{03} = \int \left| \frac{d(KE_{in})}{dt} \right| dt,$$

where $K$ is a constant.

The input and output terminals of operational amplifier 22 may be directly shunted through switch 23 which is mechanically coupled to (as shown by dotted line 24) and controlled by relay 19 whose selective energization is, in turn, controlled by timer 20 for the purpose of clearing operational amplifier 22 during brief predetermined intervals.

The output of operational amplifier 22 is coupled in common to a plurality of resistive elements $R_{11}$ through $R_n$. The opposite terminals of the resistors $R_{11}$ through $R_n$ may be selectively connected to the input terminal of an output meter 24 through multiposition switch means 25 having a movable contact arm 26 connected to the input of meter 24 and selectively connectable to any one of the terminals of resistive elements $R_{11}$–$R_n$.

Meter 24 is provided with an indicating needle 27 which cooperates with a dial face having a graduated scale 28 to provide a visually observable reading of the output signal $E_{03}$ during each of the reading intervals.

The operation of the circuit of FIG. 1 is as follows:

A suitable time interval is first selected by manipulating adjustable timer 20 so as to operate in the following manner:

Relays 18 and 19, when deenergized, are biased such as to maintain their associated contacts 17 and 23 in the upper solid line position, as shown in FIG. 1, such that contact 17 engages terminal 16 and such that contact 23 is disengaged from terminal 29. Let it be assumed that the interval during which a reading occurs is 10 seconds. The contacts 17 and 23 will then be retained in the above-mentioned position for a period of 10 seconds. At the end of a 10-second interval, timer 20 simultaneously energizes relays 18 and 19, causing the contacts 17 and 23, respectively, to be moved to their position such that contact 17 engages grounded terminal 21 and such that contact 23 electrically engages terminal 29. The period of energization of relays 18 and 19 lasts for a mere fraction of a second, which interval nevertheless is sufficient to cause integrating circuit 22 to be cleared in readiness for the next measurement period. The brief energization of relays 18 and 19 is then terminated, causing contact 17 to be reengaged with terminal 16 and causing contact 23 to be disengaged from terminal 29. This condition will be maintained for the measurement interval (which, as described above, may be a duration of 10 seconds) during which the next reading cycle is carried out.

The time intervals may alternatively be carried out manually through the use of a watch (preferably a stop watch) enabling relays 18 and 19 to be replaced by simple manually operable switches. Obviously, if desired, relays 18 and 19 may be replaced by a single relay which operates to control the operation of both contacts 17 and 23. As another alternative, relays 18 and 19 may be replaced by suitable electronic switches (such as, for example, vacuum tubes, transistors, etc.) which may be operated to establish the appropriate connections which are maintained for a long interval (i.e., 10 seconds) during the measurement cycle and which may be reversed and very briefly maintained (i.e., for a mere fraction of 1 second) during the interval between measurement cycles for the purpose of clearing the integrating circuit 22.

The mathematical manipulation of the circuitry shown in FIG. 1 results in a signal applied to meter 24, which causes a deflection of the meter indicating needle 27 by an amount proportional to the amplitude of the signal applied to the input of the meter. The amount of deflection may be read on the graduated scale 28 which may be provided with designations adjacent appropriate locations on each scale indicative of the various cardiac arrhythmias. As an alternative, a chart relating the various readings to cardiac arrhythmias may be used in conjunction with the scale which may alternatively be provided with numerical readings arranged at intervals along the graduated scale 28.

Some of the results capable of being obtained through the use of the computational device of FIG. 1 are shown in the graph of FIG. 2 wherein the discrete numerical readings (in normalized units) are plotted along the ordinate and the variability or standard deviation is plotted along the abscissa. Since these operations have been found to result in linear relationship between various cardiac patterns (note dotted line L), prediction becomes highly precise. The sample readings were taken from three different subjects. The point $S_1$ indicates the reading of a subject having normal sinus rhythm. The sample $S_2$ was taken from a subject having ventricular tachycardia and ventricular fibrillation (which latter condition is lethal). The third reading $S_3$ was taken from a subject suffering from auricular fibrillation and ventricular premature contractions. Each sample reading had a time duration of 10 seconds. The graduated scales accompanying each sample point indicate three standard deviations which ordinarily includes 99 percent of a population which is a more or less symmetrical distribution. The distributions have been found to tend toward leptokurtosis. The measurements were taken through the use of a crude timing device. It has been found that a correction of 5 percent timing error will reduce variability and increase central concentration, making the distribution overlap of the conditions highly unlikely. It should be noted that the large variability of the $S_2$ index is due to the combination of two distinct populations. It should further be noted that the plotted points are linearly related to each other indicating the fact that there are stable quantitative differences amongst the various cardiac arrhythmias when these mathematical operations are applied. It should further be pointed out that the subject suffering from ventricular tachycardia and ventricular fibrillation represents a continuous ventricular tachycardia from which the ventricular fibrillation sample is a random sample based on 2 minutes of ventricular fibrillation. The actual ventricular fibrillation reading is 94 relative to the scale of FIG. 2. The probability of obtaining a reading of 94, given the mean and standard deviation for normal sinus rhythm control is substantially less than 0.001 on the basis of pure chance. The values plotted in FIG. 2 compare favorably with mathematical calculations based on the results of an electrocardiogram. Twenty-five samples of each of the three subjects employed in taking the readings of FIG. 2 were further employed to calculate the standard deviation. FIG. 1a shows a modified meter face 28 wherein the possible conditions A, B, C, etcetera may be provided on the graduated scale.

The circuitry of FIG. 1 may be used in a number of applications. For example, as an in-line monitor for patient status during surgery; an in-line monitor for patient status during intensive post-operative care or convalescent care; continuous analysis of extensive duration cardiac activity; and analysis of recorded cardiac activity such as, for example, EKG signals recorded on magnetic tape. The discrete output is approximately normal, and can be used in variance analysis of group trend and trend differences. The assumptions underlying the parametric tests are not correlated with the time constant of the sample, and thus samples based on different recycling times can be compared with one another. The circuit is relatively inexpensive to construct and maintain, has extremely high reliability, does not require "trained" personnel to interpret the results, is applicable to research as well as patient care, and may be used as a basis for a model of precontractual electrical activity.

FIG. 3 shows a system in which the cardiac rhythm computer device 10 may be provided as an integral part. As shown in FIG. 3, the subject 30 is coupled to an EKG amplifier 31 through the use of the typical electrodes employed with EKG electrocardiographs. The output of the amplifier 31 may be coupled either to an EKG recorder 32 or to computer 10, or both. The recorder 32 may be employed to produce a permanent record of the EKG signals. The computer 10 has its output coupled to a display device (meter) 24 and may further be coupled to a circuit 33 which may be an automatic warning device, or a resuscitation system. In the case where an automatic warning device is employed, the critical range of the cardiac rhythm computer output signal may be determined, and this range may be employed as a threshold level for the warning device which may, for example, be an alarm of either the audible or illuminating type (or both) which is energized as soon as the threshold level is achieved.

In the case where the output of the computer 10 is coupled to a resuscitation system or a rhythm control device, the appropriate signal level of the output of computer 10 may be determined and thereafter selected as a threshold level for such a rhythm control device or resuscitation system to apply appropriate defibrillation or rhythm control signals to the subject in an effort to recover normal sinus rhythm.

It can be seen from the foregoing that the present invention provides a novel analog computer device which provides in-line indices of various cardiac arrhythmias whose method is unique as compared with conventional devices. Ordinarily, digital computers, using R-waves or other means to trigger a pulse, provide R—R interval trends, but, without the provision of complex and expensive memory devices, not much else can be obtained from precontractual cardiac activity, making digital techniques unavailable in the ordinary cardiologic setting.

The discrete indices obtained from the computer output of the present invention are analyzed in ordinary parametric methods. In addition, due to the specific nature of the indices generated, no trained observer is required to interpret the results. The computer output can be verbally labeled or interfaced with automatic warning devices. In addition to the research potential of the invention, the computer process has obvious applications in in-surgery, post-operative and convalescent care. The total cost of the computer is quite low, while its reliability is quite high.

A careful study and logical interpretation of the relationship between output samples of various subjects has led to the development of a model of cardiac activity based on the relationship between what appears to be additive components and other psychophysiological indices of automatic activity and its effect on the inhibition of an apparently built-in fibrillation system. It, therefore, appears that fibrillation (for example, ventricular fibrillation) is not a failure to maintain normal cardiac rhythm, but a primitive system which fails to be inhibited under certain circumstances, particularly a sudden and sharp decrease in overall somatic activity.

Although this invention has been described with respect to particular embodiments, it should be understood that many variations and modifications will now be obvious to those skilled in the art, and, therefore, the scope of this invention is limited not only by the specific disclosure herein, but only by the appended claims.

I claim:

1. A device for detecting and providing appropriate indications for the presence of either normal sinus rhythm or cardiac arrhythmias of a patient's heart, all of which possible conditions have a linear relationship, comprising:

first input means for receiving electrocardiac signals comprised of a plurality of substantially repetitive signal portions;

second differentiating means coupled to said input means for differentiating said electrocardiac signals;

third means coupled to said differentiating means for generating signals representative of absolute value of the output of said differentiating means;

fourth means for integrating the output of said third means;

meter means coupled to said integrating means for providing a visually observable reading of said electrocardiac signals;

said meter means including means for adjustably attenuating the signal applied to said meter means relative to a selected reference level;

and fifth means for periodically clearing said fourth means after a plurality of said signal portions have passed to said fourth means.

2. The device of claim 1 wherein said meter means is further comprised of a dial face and a cooperating pointer being deflected by an amount representative of the output signal level of said fourth means;

said dial face having a graduated scale with markings representative of various types of cardiac arrhythmias along said scale.

3. The device of claim 1 wherein said adjustable means comprises variable resistance means coupled between said meter means and said fourth means for adjustably limiting the current magnitude of the signal applied to said meter means.

4. The device of claim 1 further comprising a plurality of electrodes connected to said input means and adapted to be removably applied to a patient for coupling electrocardiac signals to said input means.

5. The device of claim 4, wherein said input means comprises adjustable amplifier means for amplifying said electrocardiac signals by a predetermined and adjustable amount of gain.

6. The device of claim 1 wherein said fifth means is further comprised of adjustable timer means;

said fourth means being normally operative;

said timer means including means for clearing said fourth means at regular intervals, the time duration between each of said clearing intervals being constant and being substantially greater than the time duration of a clearing interval.

7. The device of claim 6 wherein said timer means is further comprised of means for disconnecting said fourth means from said third means simultaneously with the occurrence of a clearing operation.

* * * * *